(12) United States Patent
Rasche et al.

(10) Patent No.: US 7,574,026 B2
(45) Date of Patent: Aug. 11, 2009

(54) METHOD FOR THE 3D MODELING OF A TUBULAR STRUCTURE

(75) Inventors: Volker Rasche, Hamburg (DE); Babak Movassaghi, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 506 days.

(21) Appl. No.: 10/545,184

(22) PCT Filed: Jan. 23, 2004

(86) PCT No.: PCT/IB2004/000261

§ 371 (c)(1),
(2), (4) Date: Aug. 9, 2005

(87) PCT Pub. No.: WO2004/072903

PCT Pub. Date: Aug. 26, 2004

(65) Prior Publication Data

US 2006/0159326 A1    Jul. 20, 2006

(30) Foreign Application Priority Data

Feb. 12, 2003 (EP) .................................. 03100306

(51) Int. Cl.
*G06K 9/00* (2006.01)
(52) U.S. Cl. .................. 382/128; 382/131; 382/266; 345/419; 372/19; 372/62
(58) Field of Classification Search ................ 382/131; 372/62, 19; 345/419
See application file for complete search history.

(56) References Cited

U.S. PATENT DOCUMENTS 6,148,095 A * 11/2000 Prause et al. ................ 382/131

6,385,285 B1 * 5/2002 Vaillant et al. ................ 378/62
6,928,314 B1 * 8/2005 Johnson et al. ............. 600/407

(Continued)

FOREIGN PATENT DOCUMENTS

EP    1081647 A1    3/2001

(Continued)

OTHER PUBLICATIONS

Wink et al, Fast Delineation and Visualization of Vessels in 3-D Angiographic Images, IEEE Transactions on Medical Imaging, vol. 19, No. 4, Apr. 2000, pp. 337-346.

(Continued)

*Primary Examiner*—Jingge Wu
*Assistant Examiner*—Tsung-Yin Tsai

(57) ABSTRACT

The invention provides a method for 3D modeling of a three-dimensional tubular structure of an examination object from 2D projection images (D) of the structure taken from different projection directions. The method has the following steps: reconstruction of a 3D image from the 2D projection images (D); selection of at least one 3D central line point (MO) in the 3D image, said 3D central line point being located in the structure; segmentation of 3D central line points (M) of the structure in the 3D image; forward projection of the 3D central line points (M), which have been segmented in the 3D image, into 2D projection images (D'); determination of border points of the structure in the 2D projection images (D') on the basis of 3D central line points (Z) that have been projected in; and back-projection of the border points from the 2D projection image (D') into the 3D image.

9 Claims, 2 Drawing Sheets

U.S. PATENT DOCUMENTS 7,079,132 B2 * 7/2006 Sauer et al. ................. 345/419
2005/0249399 A1 * 11/2005 Tek et al. .................... 382/154

OTHER PUBLICATIONS

Wink et al, "Minimum Cost Path Determination Using a Simple Heuristic Function" Proc. International Conference on Pattern Recognition-4, Barcelona, Sep. 2000, pp. 1010-1013.

Noboru et al, "Three-Dimensional Image Analysis of Blood Vessels Using Cone-Beam CT", Nuclear Science Symposium and Medical Imaging Conference, 1994, pp. 1519-1523.

Chen et al, "3-D Reconstruction of Coronary Arterial Tree to Optimize Angiographic Visualization" IEEE Trans. Medical Imaging, 2000, 19:318-336.

Movassaghi et al, "3D Vessel Axis Extraction Using 2D Calibrated X-ray Projections for Coronary Modeling", Proceedings of the SPIE, Medical Imaging, 2003, vol. 5032, Feb. 20, 2003, pp. 1491-1498.

European Patent Application 02077203.4 (ID201823).

* cited by examiner

METHOD FOR THE 3D MODELING OF A TUBULAR STRUCTURE

The present invention relates to a method for the 3D modeling of a three-dimensional tubular structure of an examination object from a number of 2D projection images of the tubular structure taken from different projection directions. Furthermore, the invention relates to a corresponding 3D modeling device and also to a computer program for implementing the method.

An accurate quantitative analysis of the coronary arteries is important in order to diagnose ischemic disorders. The necessary user interaction is one limitation of the 3D modeling methods currently used, in which the central lines of the tubular vessel structures are defined in the 2D projection images. Such a method is described, for example, in "3D Reconstruction of Coronary Arterial Treat to optimize Angiographic Visualation", Chen S. and Carroll J., IEEE Trans. Medical Imaging, 19:318-336 (2000). A method for the 3D modeling of a three-dimensional tubular structure from 2D projection images is moreover also described in European patent application 02 077 203.4 (ID 201823). In that case, a 3D model of a tubular structure, for example the coronary vessels, is obtained from 2D projection images using so-called epipolar lines.

The automatic segmentation of the central lines of tubular structures is currently not possible on account of the superposition of the structures in the 2D projection images and on account of the limited information in a projection. Furthermore, the 2D central lines currently have to be extracted from each projection independently of one another, and this requires a great number of complicated user interactions.

It is therefore an object of the invention to specify an improved method for the 3D modeling of a three-dimensional tubular structure of an examination object, which method can be implemented with considerably less user interaction and thus virtually automatically, with a high degree of accuracy being achieved at the same time.

According to the invention, this object is achieved by a method as claimed in claim 1, comprising the steps:

a) reconstruction of a 3D image from the 2D projection images,
b) selection of at least one 3D central line point in the 3D image, said 3D central line point being located in the tubular structure,
c) segmentation of other 3D central line points of the tubular structure in the 3D image,
d) forward projection of the 3D central line points, which have been segmented in the 3D image, into the 2D projection images,
e) determination of border points of the tubular structure in the 2D projection images on the basis of the 3D central line points that have been projected in, and
f) back-projection of the border points from the 2D projection images into the 3D image.

This object is also achieved by a corresponding device, as specified in claim 8. A computer program for implementing the method according to the invention on a computer is specified in claim 9. Advantageous versions of the invention are specified in the dependent claims.

The invention is based on the concept of determining information that is necessary for the 3D modeling by a combination of the analysis of a volume reconstruction (which has a low resolution) of the 2D projections on which it is based (which have a high resolution). The 3D central line of the tubular structure that is to be modeled is in this case determined by segmenting the reconstructed volume data. In order to obtain the precise border points of the tubular structure, the 3D central line points determined in the volume data are projected forward into the 2D projections on which they are based, and this has the advantage that the correspondences between the 2D central line points resulting in the 2D projections are recognized automatically. The border points of the tubular structure are then determined in the respective 2D projections, and these border points are then combined again by back-projection into the 3D volume in order to obtain a 3D estimate of the border points of the tubular structure. This information is then used to create a 3D model of the tubular structure.

Compared to known methods, the method according to the invention requires hardly any user interaction; in principle, the method merely requires the selection of just one 3D central line point in the 3D image as a start point for the segmentation of other 3D central line points. Moreover, the correspondences between the 3D central line points projected into the 2D projection images are found automatically, so that there is no need for any complicated registering, for example by means of epipolar lines as in the case of the method described in European patent application 02 077 203.4 (ID 210823). This means that the method according to the invention also requires considerably less computation steps while retaining the same high degree of accuracy.

The method according to the invention is independent of the imaging architecture used and can therefore for example process 2D projection images which have been taken using a monoplanar or biplanar X-ray system, provided that the projection geometry, that is to say the position of the detector plane and the focus point of the X-ray tubes, during taking of the 2D projection images is known. One potential field of application of medical imaging, in particular three-dimensional rotation angiography, is the reconstruction of 2D images of objects that have moved, such as the heart or coronary vessels of a patient for example. The periodic movement of the object must be taken into account in the imaging, which is why in one preferred version of the method according to the invention a corresponding movement signal is used, said movement signal recording for example the contraction movement of the heart or the respiratory movement of the patient. A four-dimensional data set is thus recorded and reconstructed, with the time or the individual movement phases of the periodic movement being used as the fourth dimension.

The method according to the invention is preferably used to image the coronary vessels of a patient. The coronary vessels essentially undergo a periodic movement on account of the regular contraction of the heart. This movement is preferably recorded by means of an electrocardiogram (ECG), which is taken at the same time as the 2D projection images are taken and thus makes it possible for the individual 2D projection images to be assigned to individual movement phases of the heart. As an alternative or in addition, it is also possible, for example in other applications, such as an examination of a patient's lung, for a respiratory movement signal to be recorded, said respiratory movement signal representing the respiratory movement of the patient while the 2D projection images are being taken. The respiratory movement is likewise essentially a periodic movement, which can be taken into account and compensated during reconstruction of the 4D image data set of the tubular structure in order to achieve an even higher degree of accuracy. In such applications, it is necessary that the 3D image reconstructed initially from the 2D projection images has a low resolution since 2D projections that are not sufficient for reconstructing a 3D image having a high resolution are present, for example in the same heart movement phase.

The method according to the invention can also be used for tubular structures other than the coronary vessels, for example to reconstruct a 4D image data set of the intestines or airways of a patient. However, the method according to the invention can be used not only in medical imaging but also in principle in industrial imaging.

In a further preferred version of the method, in step b) at least one start point and one end point of a 3D central line in the tubular structure is selected, it also being possible for a number of 3D central line points to be selected although this accordingly requires a greater number of user interactions. Nevertheless, a greater number of selected 3D central line points increases the rapidity and accuracy of the segmentation of other 3D central line points which is to be carried out in the next step.

In a further version, it is provided that the 3D image that is initially reconstructed from the 2D projection images is constructed with a low resolution, as a result of which simpler and more rapid reconstruction is possible. The reconstruction of a 3D image from a two-dimensional data set, that is to say from 2D projection images taken at the same movement phases within a periodic movement, is usually only possible with a low resolution, since data that are insufficient for a high resolution are present in the same movement phase. Nevertheless, the method according to the invention makes it possible for a 3D model of the tubular structure to be created, since the determination of border points of the tubular structure is carried out in the high-resolution 2D projection images.

In an advantageous further embodiment of the method according to the invention, the determination of border points of the tubular structure in the 2D projection images takes place automatically, that is to say without user interactions. In this case, image values along a cross section through the tubular structure are taken into account, and the profile of the gray values in the cross section through the tubular structure in a 2D projection image is thus considered, for example, with the cross section being made through a 3D central line point projected into a 2D projection image. Using this gray value profile, it is possible for the border points of the tubular structure to be determined, since at those points the image value or gray value profile has an extremum. However, other possibilities are also known, such as, for example, methods based on the evaluation of the 1st or 2nd derivation of the image value or gray value profile or the so-called scale space method which is known to the person skilled in the art.

The invention will be further described with reference to examples of embodiments shown in the drawings to which, however, the invention is not restricted.

Figure 1:
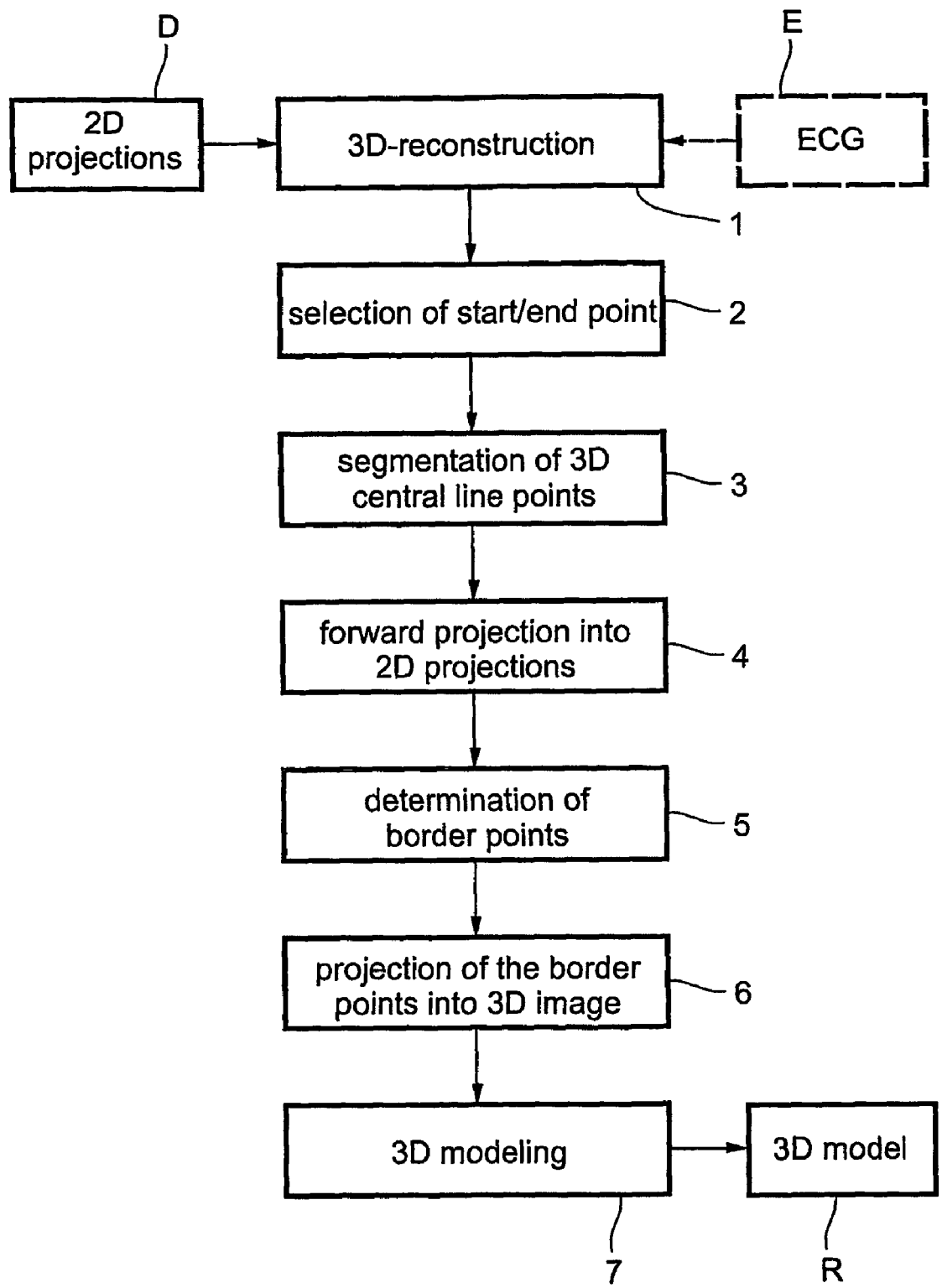
FIG. 1 shows a flowchart of the method according to the invention.

The essential steps of the method according to the invention are shown in the flowchart of FIG. 1. Into the 3D construction of a 3D image which in this case has a low resolution, said 3D reconstruction taking place in the first step (1), there flow at least 2D projection data D which have been recorded for example using a CT scanner or C-arm X-ray device from different viewing angles of the examination object, for example the heart of a patient. On account of the movement of the heart during the recording of the 2D projection data, only some of the 2D projections can be used for the 3D volume reconstruction, with those that can be used belonging to the same movement phase of the heart. In order to filter out these 2D projections, ECG data E are recorded at the same time as the 2D projection data are recorded. As a result, the number of usable 2D projection data is of course reduced, which may result in disruptive artifacts in the 3D image and only allows the creation of a 3D image having low resolution. If, of course, an examination object which is not moving is to be considered, the recording of the ECG data E or in general the recording of a movement signal can be omitted, and all recorded 2D projection data D can in principle be used for the 3D reconstruction. An MIP image (MIP=Maximum Intensity Projection) is shown symbolically for the reconstructed 3D image B in FIG. 2, in which MIP image there can also be seen the tubular structure H that is to be modeled, namely a number of vessels.

Whereas the image quality of the reconstructed (low-resolution) 3D image is sufficient for an estimate of 3D central lines within tubular structures in the 3D image, for example for estimating the 3D central lines located within blood vessels when the coronary vessels are under consideration, the resolution is not sufficient for a quantitative analysis of the border regions of the tubular structure H. In step 3, therefore, a segmentation of 3D central line points in the 3D image is first carried out after the user has selected (2) at least one start and/or end point M0 for the segmentation. For this purpose, there may be used, for example, a segmentation based on the so-called "front propagation method", combined with a "propagation speed response function" based on cylinder models, as described in "Vessel Segmentation for Visualization of MRA with Blood Pool Contrast Agents", Young S., Pekar V. and Weese J., MICCAI 2001, Utracht, The Netherlands, 491-498. Other 3D central line segmentation methods can also be used for this purpose, as described, for example, in O. Wink, W. J. Niessen and M. A. Viergever, "Minimum Cost Path Determination Using a Simple Heuristic Function" in Proc. International Conference on Pattern Recognition—4, pp. 1010-1013, Barcelona, September 2000 or O. Wink, W. J. Niessen and M. A. Viergever, "Fast Delineation and Visualization of Vessels in 3D Angiographic Images," in IEEE Transactions on Medical Imaging, Vol. 19, No. 4, pp. 337-346, April 2000. Examples of 3D central line points M obtained for the vessels contained in the 3D image are shown in FIG. 2.

Figure 2:
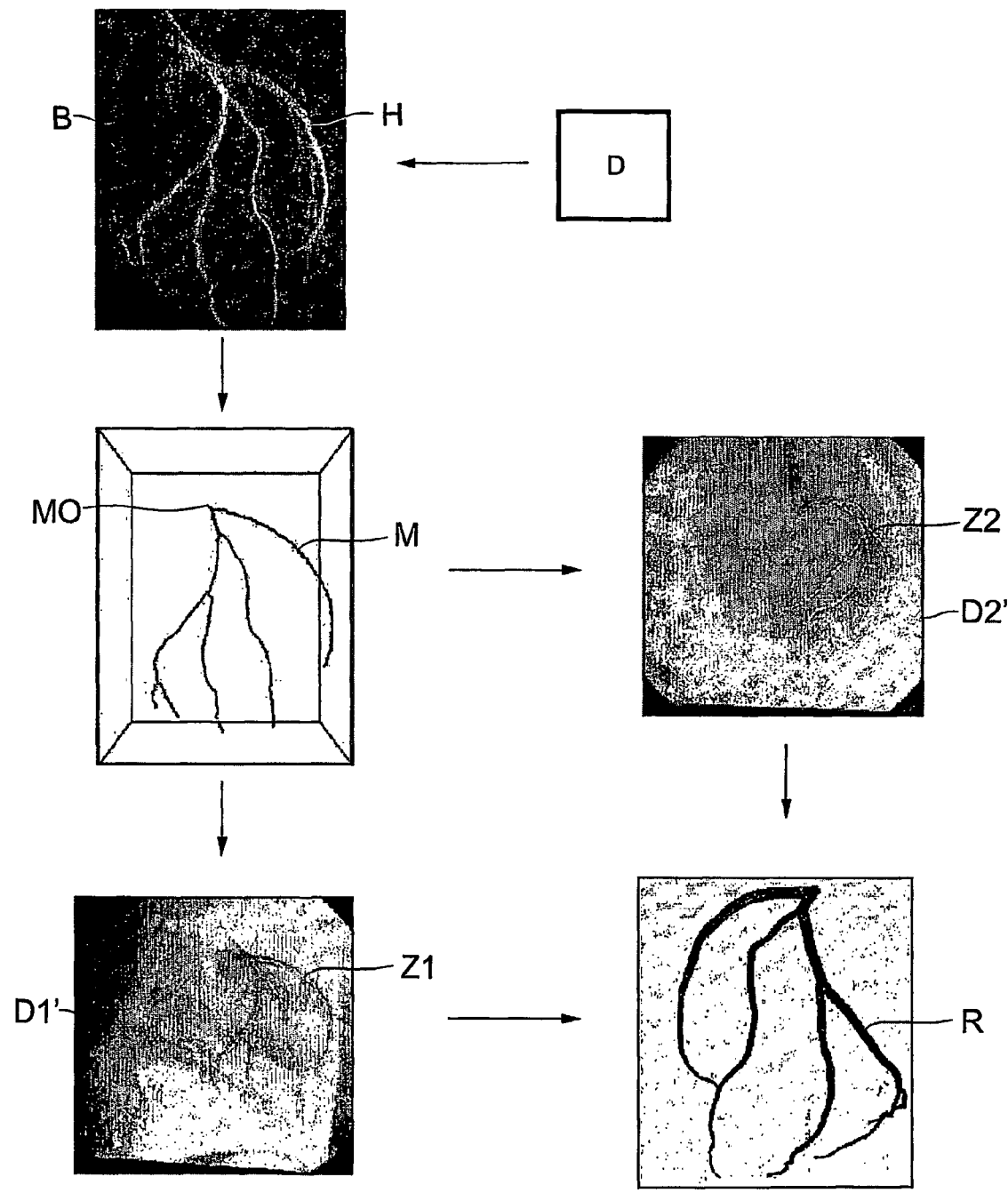
FIG. 2 shows a pictorial representation of the essential method steps.

In the next step (4), the 3D central line points M obtained are projected forward into the 2D projections D used initially to reconstruct the 3D image, as is likewise shown in FIG. 2 by way of example for two 2D projections D1' and D2'. The projected-in 3D central line points Z1, Z2 can also be seen therein. Since these central line points Z1, Z2 have been projected in from the same 3D volume, and since the projection geometry with which the respective 2D projection was taken is known, the correspondences between the individual 3D central line points Z1, Z2 between the individual 2D projections D1', D2' are found automatically. There is thus no longer any need for a step to produce these correspondences individually, for example by means of complicated registering, for which purpose known methods use, for example, the so-called epipolar line method.

Subsequently, the border points of the vessels H are then (5) determined in each 2D projection D1', D2' on the basis of the central line points Z1, Z2. This may be effected, for example, using the gray value profiles in the 2D projections, since the gray value profile normally has an extremum at the borders of the vessels. This step is not shown in any greater detail in FIG. 2.

The border points that have been found in the individual 2D projections D1' are then (6) back-projected into the 3D image, with use again being made of the known correspondence of border points that are associated with one another on account of the known correspondence between the central line points Z1, Z2 and in the 2D projections D1', D2'. Finally, a 3D model R, as shown in FIG. 2, of the vessel system can thus (7) be modeled.

According to the invention, a 3D model of a tubular structure can thus be created in a fully automatic manner, said 3D model having a high degree of accuracy on account of the use of the high-resolution 2D projections to determine border points of the tubular structure. In the extreme, the user need select just one start point for the segmentation of the 3D central line points in the 3D volume. Where appropriate, even this selection can be fully automated. The method according to the invention thus has a considerably lower computational complexity and requires considerably less user interactions while retaining the same degree of accuracy.

The invention claimed is:

1. A method for the 3D modeling of a three-dimensional tubular structure of an examination object from a number of 2D projection images (D) of the tubular structure (H) taken from different projection directions, comprising the steps:
   a) reconstruction of a 3D image (B) from the 2D projection images (D),
   b) selection of at least one 3D central line point (M0) in the 3D image (B), said 3D central line point being located in the tubular structure (H),
   c) segmentation of other 3D central line points (M) of the tubular structure (H) in the 3D image (B),
   d) forward projection of the 3D central line points (M), which have been segmented in the 3D image (B), into the 2D projection images (D'),
   e) determination of border points of the tubular structure (H) in the 2D projection images (D') on the basis of 3D central line points (Z) that have been projected in, and
   f) back-projection of the border points from the 2D projection images (D') into the 3D image (B).

2. A method as claimed in claim 1, characterized in that in step b) at least one start point and one end point of a 3D central line (M) in the tubular structure (H) is selected.

3. A method as claimed in claim 1, characterized in that the 3D image (B) is reconstructed to have a low resolution.

4. A method as claimed in claim 1, characterized in that the determination of border points of the tubular structure (H) in the 2D projection images (D) in step e) takes place automatically, in particular by taking account of the image values along a cross section through the tubular structure (H).

5. A method as claimed in claim 1, characterized in that, in parallel with the taking of the 2D projection images (D), a movement signal (E) that represents a periodic movement of the examination object is recorded, and in that the 3D image (B) is created from 2D projection images (D) taken in the same movement phases.

6. A method as claimed in claim 1, characterized in that an electrocardiogram or a respiratory movement signal is used as movement signal (E).

7. A method as claimed in claim 1, characterized in that the method is used to image the coronary vessels of a patient.

8. A device for the 3D modeling of a three-dimensional tubular structure of an examination object from a number of 2D projection images (D) of the tubular structure (H) taken from different projection directions, comprising:
   a) a reconstruction unit for reconstructing a 3D image (B) from the 2D projection images (D),
   b) selection means for selecting at least one 3D central line point (M0) in the 3D image (B), said 3D central line point being located in the tubular structure (H),
   c) a segmentation unit for segmenting other 3D central line points (M) of the tubular structure (H) in the 3D image (B),
   d) a forward projection unit for the forward projection of the 3D central line points (M), which have been segmented in the 3D image (B), into the 2D projection images (D'),
   e) a border point determination unit for determining border points of the tubular structure (H) in the 2D projection images (D') on the basis of the 3D central line points (Z) that have been projected in, and
   f) a back-projection unit for the back-projection of the border points from the 2D projection images (D') into the 3D image (B).

9. A computer program embodied in a computer-readable medium and having computer programming means for instructing a computer to carry out the steps of the method:
   a) reconstruction of a 3D image (B) from the 2D projection images (D),
   b) selection of at least one 3D central line point (M0) in the 3D image (B), said 3D central line point being located in the tubular structure (H),
   c) segmentation of other 3D central line points (M) of the tubular structure (H) in the 3D image (B),
   d) forward projection of the 3D central line points (M), which have been segmented in the 3D image (B), into the 2D projection images (D'),
   e) determination of border points of the tubular structure (H) in the 2D projection images (D') on the basis of 3D central line points (Z) that have been projected in, and
   f) back-projection of the border points from the 2D projection images (D') into the 3D image (B).

* * * * *